United States Patent
Ufkes et al.

[11] Patent Number: 5,880,674
[45] Date of Patent: Mar. 9, 1999

[54] SYSTEM FOR PROCESSING OUTPUT SIGNALS ASSOCIATED WITH MULTIPLE VEHICLE CONDITION SENSORS

[75] Inventors: Phi Ufkes, Summerville, S.C.; Gary Eckert, North Vernon, Ind.

[73] Assignee: Cummins Engine Company, Inc., Columbus, Ind.

[21] Appl. No.: 855,871

[22] Filed: May 12, 1997

[51] Int. Cl.[6] .................................................. B60Q 1/00
[52] U.S. Cl. .......................... 340/438; 340/450; 340/459
[58] Field of Search .................................... 340/438, 450, 340/450.2, 459, 522, 441, 461

[56] References Cited

U.S. PATENT DOCUMENTS

| | | | |
|---|---|---|---|
| 3,509,529 | 4/1970 | Utter | 340/450 |
| 4,437,986 | 3/1984 | Hutchins et al. | 210/130 |
| 4,488,970 | 12/1984 | Clark | 210/746 |
| 4,495,069 | 1/1985 | Davis | 210/114 |
| 4,502,955 | 3/1985 | Schaupp | 210/149 |
| 4,512,882 | 4/1985 | Fischer et al. | 210/86 |
| 4,539,109 | 9/1985 | Davis | 210/104 |
| 4,546,646 | 10/1985 | Takahashi | 340/459 |
| 4,562,431 | 12/1985 | Jahnke et al. | 340/604 |
| 4,637,351 | 1/1987 | Pakula | 123/25 J |
| 4,638,305 | 1/1987 | Sutton | 340/438 |
| 4,680,110 | 7/1987 | Davis | 210/114 |
| 4,827,242 | 5/1989 | Blankenship et al. | 340/450 |
| 4,843,557 | 6/1989 | Ina et al. | 340/459 |
| 5,044,335 | 9/1991 | Flaig | 123/198 D |
| 5,053,120 | 10/1991 | Mollmann | 210/86 |
| 5,147,559 | 9/1992 | Brophey et al. | 210/744 |
| 5,213,682 | 5/1993 | Richardson | 210/86 |
| 5,369,392 | 11/1994 | Hoffman et al. | 340/438 |
| 5,446,655 | 8/1995 | Fukuda et al. | 340/459 |
| 5,534,161 | 7/1996 | Tarr et al. | 210/744 |

FOREIGN PATENT DOCUMENTS

93/01874  2/1993  WIPO.

*Primary Examiner*—Jeffery A. Hofsass
*Assistant Examiner*—John Tweel, Jr.
*Attorney, Agent, or Firm*—Woodard, Emhardt, Naughton Moriarty & McNett

[57] ABSTRACT

A system for processing output signals associated with multiple vehicle condition sensors includes a first sensor producing a pair of output signals indicative of a first vehicle condition and a second sensor producing an output signal indicative of a second vehicle condition. One of the first sensor output signals and the second sensor output signal are received by an interface circuit which produces an output signal that is a function of its two input signals. A vehicle control computer receives the output of the interface circuit and the other of the first sensor output signals and processes these signals to provide diagnostic information related to each of the two sensors. The diagnostic information may include fault codes associated with individual ones, or a combination, of the two sensors which are stored in memory, and may further include energizing signals for energizing warning means associated with each of the two sensors.

30 Claims, 3 Drawing Sheets

| CONDITION | CSL | CSH | WIF SENSOR SIGNAL | WIF | FAULT CODE | WIFW | CLFW |
|---|---|---|---|---|---|---|---|
| NORMAL COOLANT LEVEL NO WATER IN FUEL | LOW | HIGH | LOW | LOW | NONE | OFF | OFF |
| NORMAL COOLANT LEVEL WATER IN FUEL | LOW | HIGH | HIGH | HIGH | W | ON | OFF |
| LOW COOLANT LEVEL NO WATER IN FUEL | HIGH | LOW | LOW | HIGH | C | OFF | ON |
| LOW COOLANT LEVEL WATER IN FUEL | HIGH | LOW | HIGH | LOW | C | ON | ON |

FIG. 3

SYSTEM FOR PROCESSING OUTPUT SIGNALS ASSOCIATED WITH MULTIPLE VEHICLE CONDITION SENSORS

FIELD OF THE INVENTION

The present invention relates generally to systems for processing output signals of multiple vehicle condition sensors, and more specifically to such systems including the capability to log fault conditions associated with the various vehicle condition sensors.

BACKGROUND OF THE INVENTION

The use of a water separator in a diesel engine is a well-known expedient to rid the fuel of water that might cause malfunction of the engine. Typical water separators consist of some type of water collection reservoir at the bottom of a fuel filter assembly, and various techniques have been employed to monitor the amount of water accumulated therein.

One known technique for monitoring the amount of water collected in a fuel filter assembly includes locating a water-in-fuel sensor within the water collection reservoir. When the water level reaches a predetermined level in the reservoir, the sensor is activated and a warning indicator is correspondingly energized. Typically, the warning indicator comprises a signal lamp mounted in the cab area of the vehicle so that the driver is apprised of the need to drain the fuel filter assembly.

Diesel engines, as with other internal combustion engines, further typically include an engine cooling system containing an engine coolant fluid that circulates about the engine to maintain the engine operating temperature within a desired temperature range. It is commonplace in such diesel engines to include an engine coolant level sensor therein so that the vehicle control computer may monitor the coolant level. Due to the importance of the engine cooling system, typical engine coolant level sensors provide redundant sensor signals to the vehicle control computer which then acts on these signals to store diagnostic information related to the engine cooling system as well as warn the operator of low engine coolant level conditions.

One problem with the foregoing known sensor arrangements is that the water-in-fuel sensor may or may not be monitored by the vehicle control computer. If it is, then the vehicle control computer must provide an additional input signal path to receive the water-in-fuel sensor signal. Often times, an extra input signal path to the vehicle control computer is simply not available and the water-in-fuel sensor signal is directed to a lamp driving circuit separate from the vehicle control computer. In such cases, the vehicle control computer cannot monitor the water-in-fuel sensor status and likewise cannot store diagnostic information related thereto.

What is therefore needed is a system for processing output signals associated with multiple vehicle condition sensors, such as a water-in-fuel sensor and an engine coolant level sensor, which does not increase the number of required input signal paths to the vehicle control computer, yet provides for complete status and diagnostic monitoring of each of the sensors.

SUMMARY OF THE INVENTION

The foregoing shortcomings of the prior art are addressed by the present invention. In accordance with one aspect of the present invention, a system for processing output signals associated with multiple vehicle condition sensors comprises means for sensing a first vehicle condition and producing first and second output signals corresponding thereto, means for sensing a second vehicle condition and producing a third output signal corresponding thereto, means responsive to the first and third output signals for producing a fourth output signal based thereon, and means responsive to the second and fourth output signals for producing diagnostic information associated with said first and second vehicle conditions.

In one embodiment, the means for sensing a first vehicle condition is an engine coolant level sensor operable to sense a level of engine coolant within an engine cooling system and provide the first and second output signals corresponding thereto. The first and second output signals are preferably redundant and may be complementary. The means for sensing a second vehicle condition is, in this embodiment, a water-in-fuel sensor operable to sense a level of water collected in a fuel filter assembly and provide the third output signal corresponding thereto. The means for producing the fourth output signal is preferably an interface circuit operable to produce the fourth signal as a function of the water-in-fuel sensor signal output and one of the redundant engine coolant level sensor signals. The means for processing the signals is preferably a vehicle control computer receiving the fourth output signal and the other one of the redundant engine coolant level sensor signals, and producing diagnostic information, such as fault code information and warning means energizing signals, corresponding thereto.

One object of the present invention is to provide a system for processing output signals associated with multiple vehicle condition sensors.

Another object of the present invention is to provide such a system which minimizes the number of required sensor input signals to a vehicle control computer.

Yet another object of the present invention is to provide such a system which further includes the capability to store fault information related to each individual vehicle condition sensor and to combinations of vehicle condition sensors.

Still another object of the present invention is to provide such a system which further includes the capability to energize a separate warning means for each sensor when a respective fault condition occurs.

These and other objects of the present invention will become more apparent from the following description of the preferred embodiment.

BRIEF DESCRIPTION OF THE DRAWINGS

FIG. 3 is a table illustrating one technique for operating the system of FIG. 1, in accordance with the present invention.

DESCRIPTION OF THE PREFERRED EMBODIMENTS

Figure 1:
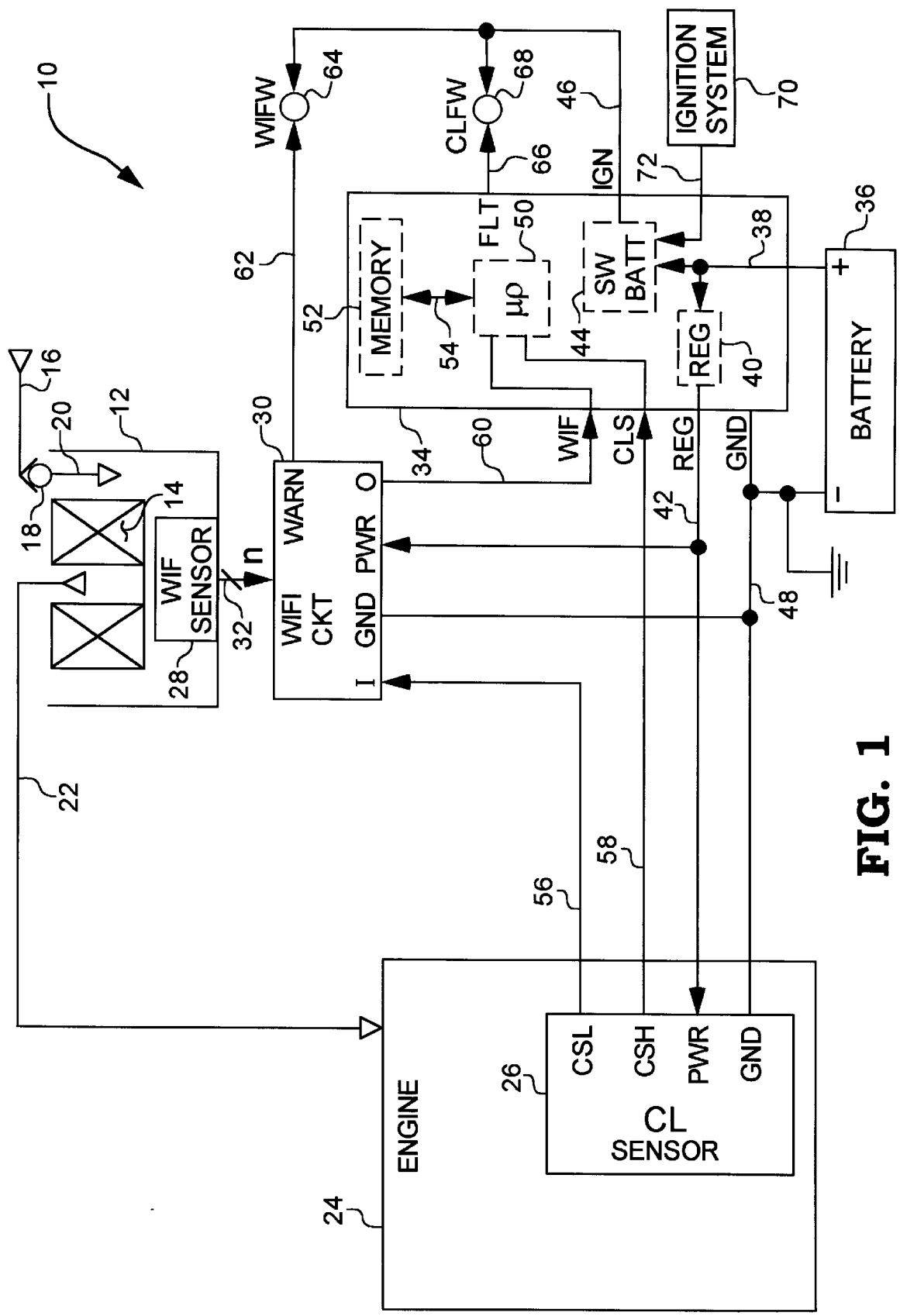
FIG. 1 is a diagrammatic illustration of one embodiment of a system for processing output signals of multiple vehicle condition sensors, in accordance with the present invention, wherein the vehicle condition sensors include a water-in-fuel sensor and an engine coolant level sensor.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIG. 1, one preferred embodiment of a system 10 for processing output signals of multiple vehicle condition sensors, in accordance with the present invention, is shown. It should be understood from the outset that although system 10 is shown and will be subsequently described as including two specific vehicle condition sensors, namely an engine coolant level sensor 26 and a water-in-fuel sensor 28, the present invention contemplates alternately including any two vehicle condition sensors so long as one of the sensors produces at least two sensor output signals that are preferably redundant, as will be described in greater detail hereinafter. Those skilled in the art will further recognize that the concepts described herein may be easily extended to include more than two sensors. For example, multiple interface circuits, each having one or more vehicle condition sensors associated therewith, may be connected in series to further reduce the number of sensor inputs to the vehicle control computer 34.

System 10 includes a fuel filter housing 12, which may be of the canister type, having a fuel filter 14 of known construction carried therein. Preferably, fuel filter 14 is positioned in the upper portion of housing 12 so that housing 12 acts as a water separator as described in the BACKGROUND section. A fuel line 16, preferably carrying diesel engine fuel, is connected to one end of a known fuel inlet valve 18, the opposite end of which is connected to a fuel inlet line 20 of housing 12. Fuel inlet valve 18 is preferably a check valve, such as a ball check valve, to disallow fuel flow from within housing 12 back into the fuel line 16.

A second fuel line 22 is connected between the housing 12 and an internal combustion engine 24, which is preferably a diesel engine of a heavy duty truck. The second fuel line 22 is connected to the housing 12 in such a manner as to require fuel flowing therethrough to pass through the fuel filter 14 as is known in the art. In this way, only filtered fuel is supplied to the engine while water and other contaminants are collected in the bottom section of the housing 12. Within the bottom section of the housing 12, a water-in-fuel (WIF) sensor 28 is positioned, which may be of known construction or which may have specific construction as described in greater detail hereinafter with respect to FIGS. 2A and 2B. In either case, WIF sensor 28 is operable to sense a level of water collected within the bottom portion of housing 12 and produce a sensor output signal corresponding thereto on any number, n, of signal lines 32.

The WIF sensor 28 is electrically connected to an interface circuit 30 via the number, n, of signal lines 32. The specific construction of interface circuit 30, referred to hereinafter as a water-in-fuel indicator (WIFI) circuit, may take many forms, and the particular details and components of circuit 30 for a given application will be well within the knowledge of those skilled in the art, particularly in view of the following functional description thereof.

Engine 24 includes an engine coolant level (CL) sensor 26 positioned within an engine cooling system thereof (not shown) both of which may be of known construction. The CL sensor 26 is operable to sense a level of engine coolant fluid within the engine cooling system and produce at least two sensor output signals corresponding thereto on signal lines 56 and 58. Preferably, CL sensor 26 produces two redundant sensor output signals CSL 56 and CSH 58, wherein the two signals are preferably complementary. Coolant level sensor output CSL 56 is connected to a signal input I of WIFI circuit 30, although the present invention contemplates that coolant level sensor output CSH 58 may be alternatively connected to the input "I" of WIFI circuit 30.

System 10 further includes a vehicle control computer 34, which is typically referred to as an Engine Control Module (ECM), Engine Control Unit (ECU), or similar designation. Alternatively, vehicle control computer 34 may be an autonomous computer separate from the ECM. In any event, vehicle control computer preferably includes a known microprocessor ($\mu$p) 50 having a WIF input connected to output "O" of WIFI circuit 30 via signal line 60, and a CLS input connected to coolant level sensor output CSH via signal line 58. Microprocessor 50 is connected to a memory unit 52 via bi-directional signal line 54 so that microprocessor 50 may store data within, and extract data from, memory unit 52.

System 10 further includes a battery 36, which is preferably the vehicle battery, and which provides a battery voltage to vehicle control computer 34 via power line 38. A ground line 48 is connected to the negative terminal of the battery 36, which is also connected to ground (GND) connections of vehicle control computer 34, CL sensor 26 and WIFI circuit 30.

Power line 38 is preferably connected to a known voltage regulator circuit 40 which is responsive to the battery voltage to produce a regulated voltage on regulated voltage line 42 (REG). Reg is preferably on the order of 5.0 volts and is connected to power connections (PWR) of CL sensor 26 and WIFI circuit 30. Power line is further preferably connected to a known switched battery circuit 44, which is responsive to the battery voltage and an ignition signal produced by a vehicle ignition circuit 70 on signal line 72 to provide a switched battery voltage on power line IGN 46 when the ignition circuit 70 is activated.

WIFI circuit 30 further includes an WARN output that produces a warning means activation signal on signal line 62 under certain conditions to be described hereinafter. Similarly, vehicle control computer 34 includes a FLT output that produces a warning means activation signal on signal line 66 under certain conditions to be described hereinafter. Signal line 62 is connected to a water-in-fuel warning means (WIFW) 64, which is further connected to IGN power line 46. Signal line 66 is likewise connected to a coolant level fault warning means (CLFW) 68, which is further connected to IGN power line 46.

Preferably, WIFW 64 and CLFW 68 are lamps located within the cab area of the vehicle, and the warning means activation signals on signal lines 62 and 66 respectively are operable to separately illuminate the lamps either continuously or in accordance with a desired lamp switching scheme. It is to be understood, however, that the present invention contemplates that WIFW 64 and/or CLFW 68 may alternately comprise other known visual warning means and/or audible warning means.

Figure 2A:
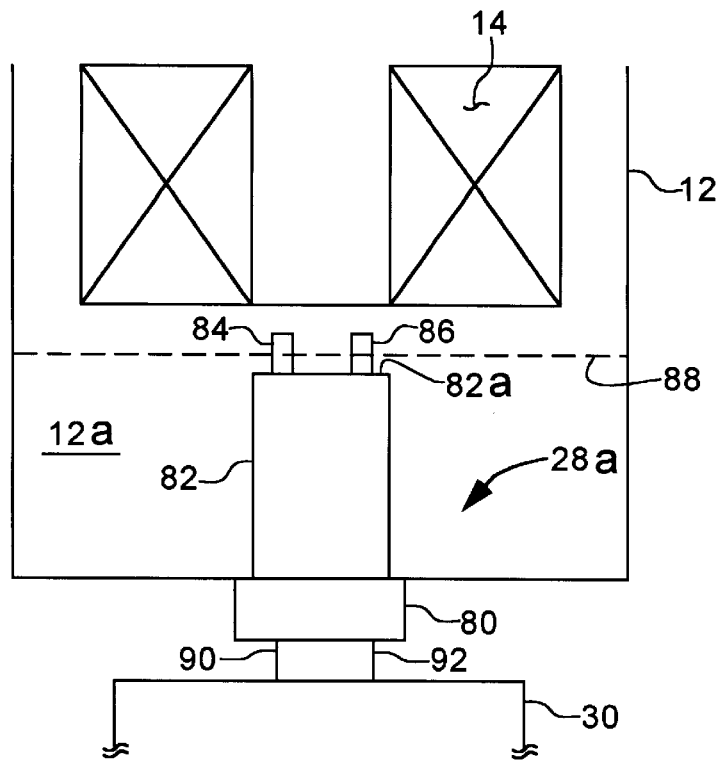
FIG. 2A is a diagrammatic illustration of one embodiment of the water-in-fuel sensor of the system of FIG. 1.

Referring now to FIG. 2A, one preferred embodiment 28a of the WIF sensor 28 of FIG. 1, in accordance with another aspect of the present invention, is shown. WIF sensor 28a includes a first housing 80, preferably electrically insulating, mounted externally to the bottom of fuel filter housing 12. A second housing 82 is connected to first housing 80 and preferably forms a water tight seal with the bottom of fuel filter housing 12. Electrically conductive probes 84 and 86 are preferably disposed in a parallel relationship with respect to each other, and each have a first end extending downwardly into housing 82. Signal line 90 is electrically connected to the first end of conductive probe 84 and signal line 92 is electrically connected to first end of conductive probe 86. These electrical connections are preferably made within housing 82, but may alternatively be made within housing 80. Both signal lines 90 and 92 form signal path 32 (FIG. 1) and are thus connected to WIFI circuit 30. The second opposite ends of conductive probes 84 and 86 extend upwardly from housing 82 into the water collection chamber 12a of housing 12 defined beneath fuel filter 14.

Housing 82 is formed from a suitable electrically insulating and waterproof material, and the height of housing 82 is chosen so as to permit a desired level of water, illustrated by the dashed line 88, to accumulate in the water chamber 12a before sensor 28a is activated. When the water level in the water chamber 12a is below the top 82a of housing 82, no electrical conduction occurs between conductive probes 84 and 86, and sensor 28a therefore produces a low level sensor output signal on signal lines 90 and 92. Conversely, when the water level in the water chamber 12a exceeds the top 82a of housing 82, such as water level 88 illustrated in FIG. 2A, electrical conduction occurs between conductive probes 84 and 86, and sensor 28a therefore preferably produces a high level sensor output signal on signal lines 90 and 92.

Figure 2B:
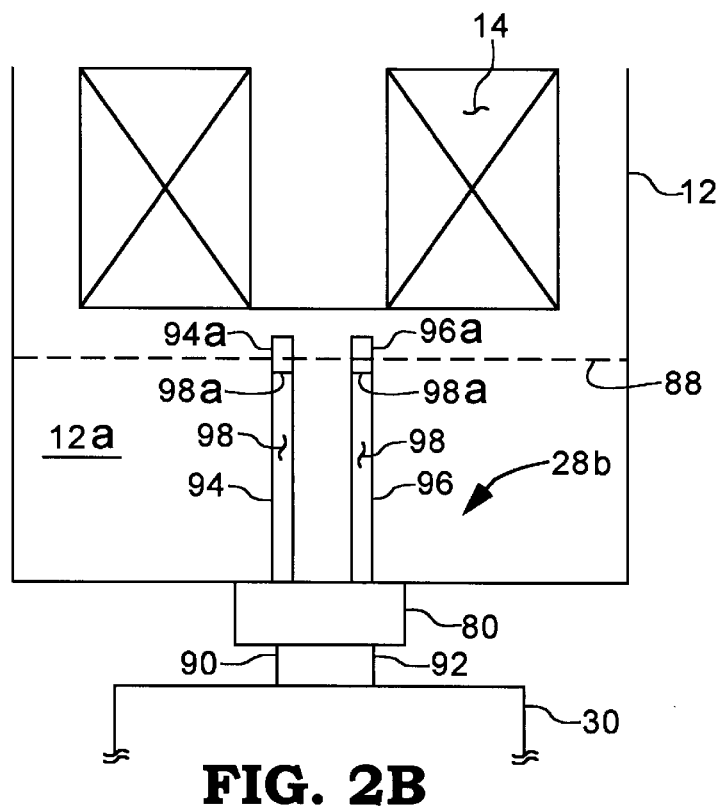
FIG. 2B is a diagrammatic illustration of an alternate embodiment of the water-in-fuel sensor of the system of FIG.

Referring now to FIG. 2B, an alternate embodiment 28b of the WIF sensor 28 of FIG. 1, in accordance with the present invention, is shown. As with WIF sensor 28a, WIF sensor 28b includes a first housing 80, preferably electrically insulating, mounted externally to the bottom of fuel filter housing 12. A pair of electrically conductive probes 94 and 96 are preferably disposed in a parallel relationship with respect to each other, and each have a first end, 94a and 96a respectively, extending upwardly from housing 80 into water chamber 12a. Signal line 90 is electrically connected to an opposite end of conductive probe 94 and signal line 92 is electrically connected to an opposite end of conductive probe 96. These electrical connections are preferably made within housing 80. Both signal lines 90 and 92 form signal path 32 (FIG. 1) and are thus connected to WIFI circuit 30.

Portions of electrically conductive probes 94 and 96 are preferably coated or otherwise surrounded by a suitable electrically insulating and waterproof material 98. The height 98a of electrically insulating material 98 is chosen so as to permit a desired level of water, illustrated by the dashed line 88, to accumulate in the water chamber 12a before sensor 28b is activated. The operation of sensor 28b is preferably similar to that of sensor 28a in that when the water level in the water chamber 12a is below the top 98a of coating 98, no electrical conduction occurs between conductive probes 94 and 96, and sensor 28b therefore produces a low level sensor output signal on signal lines 90 and 92. Conversely, when the water level in the water chamber 12a exceeds the top 98a of coating 98, such as water level 88 illustrated in FIG. 2B, electrical conduction occurs between conductive probes 94 and 96, and sensor 28b therefore preferably produces a high level sensor output signal on signal lines 90 and 92.

It is to be understood that while the above-described operation of sensors 28a and 28b is preferred in the system 10 embodiment illustrated in FIG. 1, the present invention contemplates providing the inverse of the described operation. For example, the present invention contemplates that either sensor 28a or 28b may be made to provide a high level signal when no electrical conduction occurs between the conductive probes, and to provide a low level signal when conduction is established between the probes.

Referring now to FIG. 3, a table 100 is shown which describes one preferred technique for operating system 10 of FIG. 1. As shown in columns 102 and 104 of table 100, CL sensor 26 is preferably operable to produce a low level signal at sensor output CSL and a high level signal at sensor output CSH when a normal engine coolant level condition exists, i.e. when the engine coolant level is above a predefined engine coolant level. When the engine coolant level drops below the predefined engine coolant level, CL sensor 26 produces a high level signal at sensor output CSL and a low level signal at sensor output CSH. As with the WIF sensor operation described above, it is to be understood that the present invention contemplates alternatively providing for the inverse operation of CL sensor 26. The preferred WIF sensor signals appear in column 106 of table 100.

The WIFI circuit 30 of system 10 thus receives logic level input signals from the WIF sensor 28 and the CL sensor 26, and produces an output signal on signal line "O" (hereinafter WIF) that is a function of these two signals. In a preferred embodiment, WIFI circuit 30 receives the CL sensor signal CSL and the WIF sensor signal and produces a WIF signal that tracks CSL as long as the WIF sensor signal is a low level, and that is otherwise the inverse of the CSL signal. The logic states of this preferred WIF signal produced on signal line 60 are shown in column 108 of table 100. The specific WIFI circuitry required to achieve this function is well within the skill of one of ordinary skill in the art of electrical circuit and/or system design. Those skilled in the art will further recognize that the WIF signal on signal line 60 may be any logical combination of the CSL and WIF sensor signals, and that the particular logical function used will be influenced by design choice and other factors.

The microprocessor 50 thus receives as input signals the WIF signal produced by WIFI circuit 30 on signal line 60 and the CLS signal produced at the CSH output of CL sensor 26 and provided on signal line 58. In accordance with the logical states of these signals, microprocessor 50 is operable to store certain fault codes within memory unit 52, as illustrated in column 110 of table 100. Further, both the WIFI circuit 30 and the vehicle control computer 34 are responsive to the logical states of the WIF and CSH signals to control warning lamps WIFW 64 and CLFW 68, as illustrated in columns 112 and 114 respectively of table 100.

Referring to row 120 of table 100, both WIF (column 108) and CSH (column 104) are low level signals when the engine coolant level is normal (above the predefined engine coolant level) and the water level in fuel filter housing 12 is below a predefined level. In this case, microprocessor 52 does not generate a fault code, and no fault code is thus stored in memory unit 52. Also in this case, WIFI circuit 30 and vehicle control computer each generate appropriate signals at the WARN and FLT outputs respectively to deactivate the WIFW and CLFW warning lamps. Row 120 thus represents "normal" operating conditions.

Referring to row 122 of table 100, WIF (column 108) is a high level signal and CSH (column 104) is a low level signal when the engine coolant level is normal and the water level in fuel filter housing 12 is above its predefined level. In this case, microprocessor 52 generates a fault code "W", indicative of water in fuel but normal engine coolant level, and stores this fault code (preferably time and date stamped) into memory unit 52. Also in this case WIFI circuit 30 generates an appropriate signal at the WARN output to activate the WIFW lamp 64, and vehicle control computer generates an appropriate signal at the FLT output to deactivate the CLFW warning lamp 68.

Referring to row 124 of table 100, WIF (column 108) is a low level signal and CSH (column 104) is a high level signal when the engine coolant level is low and the water level in fuel filter housing 12 is below its predefined level. In this case, microprocessor 52 generates a fault code "C", indicative of no water in fuel but low engine coolant level, and stores this fault code (preferably time and date stamped) into memory unit 52. Also in this case WIFI circuit 30 generates an appropriate signal at the WARN output to deactivate the WIFW lamp 64, and vehicle control computer generates an appropriate signal at the FLT output to activate the CLFW warning lamp 68.

Referring to row 126 of table 100, WIF (column 108) is a high level signal and CSH (column 104) is a low level signal when the engine coolant level is low and the water level in fuel filter housing 12 is above its predefined level. In this case, microprocessor 52 again preferably generates the fault code "C" and stores this fault code (preferably time and date stamped) into memory unit 52. Alternatively, the present invention contemplates that, in this case, microprocessor 50 may generate a unique fault code, indicative of low engine coolant level and water in fuel, and store this unique fault code (preferably time and date stamped) into memory unit 52. In either case, WIFI circuit 30 generates an appropriate signal at the WARN output to activate the WIFW lamp 64, and vehicle control computer generates an appropriate signal at the FLT output to activate the CLFW warning lamp 68.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected.

What is claimed is:

1. A system for processing output signals associated with multiple vehicle condition sensors comprising:

means for sensing a first vehicle condition and producing first and second output signals corresponding thereto;

means for sensing a second vehicle condition and producing a third output signal corresponding thereto;

means for combining said first and third output signals into a fourth output signal that is a simultaneous function of said first and third output signals; and means responsive to said second and fourth output signals for producing diagnostic information associated with said first and second vehicle conditions.

2. The system of claim 1 wherein said first and second output signals are redundant output signals.

3. The system of claim 2 wherein said first and second redundant output signals are complementary output signals.

4. The system of claim 1 wherein said first vehicle condition corresponds to engine coolant level;

and wherein each of said first and second output signals define first and second states respectively when engine coolant level is below a predefined engine coolant level, and define third and fourth opposite states respectively when engine coolant level exceeds said predefined engine coolant level.

5. The system of claim 4 wherein said second vehicle condition sensor corresponds to water-in-fuel;

and wherein said third output signal defines a fifth state when water-in-fuel is below a predefined water-in-fuel level, and defines a sixth opposite state when water-in-fuel exceeds said predefined water-in-fuel level.

6. The system of claim 1 wherein said diagnostic information associated with said first and second vehicle conditions includes fault conditions associated therewith;

and further including means responsive to a first fault condition associated with said first vehicle condition for warning a vehicle operator thereof.

7. The system of claim 6 further including means responsive to a second fault condition associated with said second vehicle condition for warning a vehicle operator thereof.

8. The system of claim 1 wherein said diagnostic information associated with said first and second vehicle conditions includes fault conditions associated therewith;

and further including means responsive to a first fault condition associated with said first vehicle condition for storing a first fault code corresponding thereto.

9. The system of claim 8 wherein said means responsive to said first fault condition is further responsive to a second fault condition associated with said second vehicle condition for storing a second fault code corresponding thereto.

10. The system of claim 9 wherein said means responsive to said first fault condition is further responsive to said first and second fault conditions for storing a third fault code corresponding to a simultaneous occurrence of said first and second fault conditions.

11. A system for processing output signals associated with multiple vehicle condition sensors comprising:

a first sensor sensing a first vehicle condition and producing first and second output signals corresponding thereto;

a second sensor sensing a second vehicle condition and producing a third output signal corresponding thereto;

an interface circuit having a first input receiving said first output signal and a second input receiving said third output signal, said interface circuit combining said first and third signals into a fourth output signal that is a simultaneous function of said first and third output signals; and a processor having a first input receiving said second output signal and a second input receiving said fourth output signal, said processor responsive to said second and fourth output signals to produce diagnostic information associated with said first and second sensors.

12. The system of claim 11 wherein said first and second output signals are redundant output signals.

13. The system of claim 12 wherein said first and second redundant output signals are complementary output signals.

14. The system of claim 11 wherein said first sensor is an engine coolant level sensor;

wherein said second sensor is a water-in-fuel sensor.

15. The system of claim 14 further including a fuel filter assembly operable to separate water from fuel and collect the separated water in a filter chamber;

wherein said water-in-fuel sensor includes a pair of conductive probes extending upwardly into said filter chamber;

and wherein said third output signal defines an inactive state thereof when the separated water in said filter chamber is below a level sufficient to permit conduction of electrical current between said conductive probes, and defines an active state thereof when the separated water in said filter chamber exceeds said level to thereby permit conduction of electrical current between said conductive probes.

16. The system of claim 15 wherein said water-in-fuel sensor includes an electrically insulating body formed about a portion of said conductive probes, said insulating body having one end thereof in contact with a bottom of said filter chamber and an opposite end extending upwardly into said filter chamber, said conductive probes protruding from said opposite end of said insulating body to thereby define said water level sufficient to permit conduction of electrical current therebetween.

17. The system of claim 15 wherein each of said conductive probes are separately electrically insulated along a portion thereof from a bottom of said filter chamber to thereby define said water level sufficient to permit conduction of electrical current therebetween.

18. The system of claim 11 wherein said diagnostic information associated with said first and second sensors includes fault conditions associated with said first and second vehicle conditions respectively;

and further including means responsive to a first fault condition associated with said first vehicle condition for warning a vehicle operator thereof.

19. The system of claim 18 further including means responsive to a second fault condition associated with said second vehicle condition for warning a vehicle operator thereof.

20. The system of claim 11 wherein said diagnostic information associated with said first and second sensors includes fault conditions associated with said first and second vehicle conditions respectively;

and wherein said processor further includes a memory for storing a first fault code corresponding to a first fault condition associated with said first vehicle condition, a second fault code corresponding to a second fault condition associated with said second vehicle condition and a third fault code corresponding to a simultaneous occurrence of said first and second fault conditions.

21. A system for processing output signals associated with multiple vehicle condition sensors comprising:

a first sensor sensing a first vehicle condition and producing first and second output signals corresponding thereto;

a second sensor sensing a second vehicle condition and producing a third output signal corresponding thereto;

an interface circuit having a first input receiving said first output signal and a second input receiving said third output signal, said interface circuit producing a fourth output signal having the same state as said first output signal when said third output signal is in a first state and being inversely related to said first output signal when said third output signal is in a second state; and a processor having a first input receiving said second output signal and a second input receiving said fourth output signal, said processor responsive to said second and fourth output signals to produce diagnostic information associated with said first and second sensors.

22. The system of claim 21 wherein said first and second output signals are redundant output signals.

23. The system of claim 22 wherein said first and second redundant output signals are complementary output signals.

24. The system of claim 21 wherein said first sensor is an engine coolant level sensor; and wherein said second sensor is a water-in-fuel sensor.

25. The system of claim 24 further including a fuel filter assembly operable to separate water from fuel and collect the separated water in a filter chamber;

wherein said water-in-fuel sensor includes a pair of conductive probes extending upwardly into said filter chamber;

and wherein said third output signal defines an inactive state thereof when the separated water in said filter chamber is below a level sufficient to permit conduction of electrical current between said conductive probes, and defines an active state thereof when the separated water in said filter chamber exceeds said level to thereby permit conduction of electrical current between said conductive probes.

26. The system of claim 25 wherein said water-in-fuel sensor includes an electrically insulating body formed about a portion of said conductive probes, said insulating body having one end thereof in contact with a bottom of said filter chamber and an opposite end extending upwardly into said filter chamber, said conductive probes protruding from said opposite end of said insulating body to thereby define said water level sufficient to permit conduction of electrical current therebetween.

27. The system of claim 25 wherein each of said conductive probes are separately electrically insulated along a portion thereof from a bottom of said filter chamber to thereby define said water level sufficient to permit conduction of electrical current therebetween.

28. The system of claim 21 wherein said diagnostic information associated with said first and second sensors includes fault conditions associated with said first and second vehicle conditions respectively;

and further including means responsive to a first fault condition associated with said first vehicle condition for warning a vehicle operator thereof.

29. The system of claim 28 further including means responsive to a second fault condition associated with said second vehicle condition for warning a vehicle operator thereof.

30. The system of claim 21 wherein said diagnostic information associated with said first and second sensors includes fault conditions associated with said first and second vehicle conditions respectively;

and wherein said processor further includes a memory for storing a first fault code corresponding to a first fault condition associated with said first vehicle condition, a second fault code corresponding to a second fault condition associated with said second vehicle condition and a third fault code corresponding to a simultaneous occurrence of said first and second fault conditions.

* * * * *